(12) United States Patent
Shestak et al.

(10) Patent No.: US 8,054,329 B2
(45) Date of Patent: Nov. 8, 2011

(54) HIGH RESOLUTION 2D-3D SWITCHABLE AUTOSTEREOSCOPIC DISPLAY APPARATUS

(75) Inventors: Sergey Shestak, Suwon-si (KR); Sung-yong Jung, Suwon-si (KR); Dae-sik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1520 days.

(21) Appl. No.: 11/482,856

(22) Filed: Jul. 10, 2006

(65) Prior Publication Data

US 2007/0008406 A1    Jan. 11, 2007

Related U.S. Application Data

(60) Provisional application No. 60/697,384, filed on Jul. 8, 2005.

(30) Foreign Application Priority Data

Oct. 19, 2005 (KR) .................. 10-2005-0098668
Jun. 2, 2006 (KR) .................. 10-2006-0049990

(51) Int. Cl.
    *H04N 13/04* (2006.01)
(52) U.S. Cl. ............... 348/57; 348/58; 348/59; 348/54; 348/51; 359/465; 359/464; 359/466; 359/463; 359/462
(58) Field of Classification Search ............ 348/57, 348/58, 59, 54, 51; 359/465, 464, 466, 463, 359/462
See application file for complete search history.

(56) References Cited

U.S. PATENT DOCUMENTS

| 5,875,055 | A | 2/1999 | Morishima et al. |
| 6,046,849 | A | 4/2000 | Moseley et al. |
| 6,246,451 | B1 * | 6/2001 | Matsumura et al. ............ 349/15 |
| 7,522,340 | B2 * | 4/2009 | Kim et al. ................ 359/489.14 |
| 7,626,644 | B2 * | 12/2009 | Shestak et al. .................. 349/15 |
| 2004/0240777 | A1 | 12/2004 | Woodgate et al. |

FOREIGN PATENT DOCUMENTS

| JP | 09-318911 A | 12/1997 |
| JP | 11-084131 A | 3/1999 |
| JP | 11-285030 A | 10/1999 |
| JP | 2000-102038 A | 4/2000 |
| KR | 2003-0088649 A | 11/2003 |

OTHER PUBLICATIONS

Communication and Extended European Search Report issued Dec. 1, 2010, in counterpart European Application No. 06116857.1.

* cited by examiner

*Primary Examiner* — Shawn An
(74) *Attorney, Agent, or Firm* — Sughrue Mion, PLLC

(57) ABSTRACT

A high resolution 2D-3D switchable autostereoscopic display apparatus includes: a backlight unit emitting light; a polarizer sheet changing the light emitted from the backlight unit so that the light has only a specific polarization direction; a polarization switch converting the direction of the polarization of incident light; a birefringent element array comprising a plurality of alternating first and second birefringent elements and changing the polarization direction of incident light so that the polarization of light transmitted by the first birefringent elements is perpendicular to the polarization of light transmitted by the second birefringent elements; a lenticular lens sheet separating and emitting incident light to a first eye viewing zone and a second eye viewing zone; and a display panel displaying an image.

30 Claims, 12 Drawing Sheets

HIGH RESOLUTION 2D-3D SWITCHABLE AUTOSTEREOSCOPIC DISPLAY APPARATUS

CROSS REFERENCE TO RELATED PATENT APPLICATION

This application claims priority from Korean Patent Application Nos. 10-2005-0098668 and 10-2006-0049990, filed on Oct. 19, 2005 and Jun. 2, 2006, respectively, in the Korean Intellectual Property Office, and U.S. Provisional Patent Application No. 60/697,384, filed on Jul. 8, 2005 in the U.S. Patent and Trademark Office, the disclosures of which are incorporated herein in their entirety by reference.

BACKGROUND OF THE INVENTION

1. Field of the Invention

The present invention relates to a high-resolution two-dimensional (2D)-three-dimensional (3D) switchable autostereoscopic display apparatus, and more particularly, to a high-resolution 2D-3D switchable autostereoscopic display apparatus that provides the full resolution of a display panel and without crosstalk.

2. Description of the Related Art

A 3D display apparatus produces a left eye image and a right eye image having a binocular parallax and separately directs the left and right eye images to a left eye and a right eye, respectively. The user recognizes the left eye image and the right eye image provided by the 3D display apparatus through the retina of the corresponding eyes and thus can see a stereoscopic 3D image. Generally, 3D display apparatuses can be roughly classified into a parallax barrier type 3D display apparatus and a lenticular type 3D display apparatus.

In the parallax barrier 3D display apparatuses, a left eye image and a right eye image are displayed on alternating vertical columns of pixels and separated through a very thin vertical lattice, that is, a barrier. The left eye image in a vertical column and the right eye image in a vertical column are separated by the barrier, so that the left and right eyes respectively receive images of different view points to thereby see a 3D image. Referring to FIG. 1, a lenticular type 3D display apparatus 10 generally includes a display panel 11 including left and right pixels L and R that are alternately arranged to display a right eye image and a left eye image, respectively, and a lenticular lens sheet 12 installed in front of the display panel 11 to separate the viewing zones of the left eye image and the right eye image.

In a conventional 3D image display apparatus as described above, the left eye image and the right eye image are displayed at the same time on a single display panel, and thus the resolution of the 3D image seen by the user is half of the resolution of the display panel. Moreover, a complicated structure is required to be able to switch between a 2D image mode and a 3D image mode.

Accordingly, a 3D image display apparatus which can provide a 3D image without a reduction in resolution using a fast response liquid crystal display (LCD) having a refresh rate of 120 Hz is being developed.

For example, Japanese Patent Laid-Open Gazette No. 2004-325494 discloses a 3D image display apparatus that has a display panel, an image separation unit, and a light deflecting unit. The display panel periodically shifts the right and left images alternately displayed, on a pixel-by-pixel basis. The conventional image separation unit, such as a parallax barrier, is placed in front of the display panel and separates the right and left images that are alternately displayed on the display panel. At this point, the light deflecting unit is shifted in synchronization with the shift period of the right and left images of the display panel, and thus deflects the left eye image to the left eye and the right eye image to the right eye. In the above-described configuration, a user can barely notice the reduction in the resolution because the locations of the display panel at which the left eye image and the right eye image are displayed are switched at high speed. However, the light deflecting unit is formed of a ferroelectric liquid crystal, which is expensive, and light loss due to the parallax barrier is great.

FIG. 2 is a schematic view of a related art 2D-3D switchable autostereoscopic display apparatus 20, which is disclosed in U.S. Pat. No. 5,969,850. Referring to FIG. 2, the 3D image display apparatus 20 includes a backlight unit 21, a spatial light modulator 22, a lenticular lens sheet 23, and a fast response LCD panel 26. The spatial light modulator 22 includes a plurality of cells 24 and 25, which are switched between a transparent state and an opaque state according to the ON/OFF state of the power supplied thereto. The LCD panel 26 alternately displays the left eye image and the right eye image on the entire screen at a fast refresh rate. The spatial light modulator 22 is synchronized with the switching time of the left and right eye images of the LCD panel 26 to switch the cells 24 and 25 into the transparent or opaque state. For example, while the LCD panel 26 is displaying a left eye image, the spatial light modulator 22 switches the left eye cell 24 to a transparent state, and thus the light emitted from the backlight unit 21 heads only to the left eye viewing zone 28 of the user. While the LCD panel 26 is displaying a right eye image, the spatial light modulator 22 switches on the right eye cell 25 so that the light emitted from the backlight unit 21 heads only to the right eye viewing zone 27 of the user. In a general 2D mode, all of the cells 24 and 25 of the spatial light modulator 22 are turned on.

However, in U.S. Pat. No. 5,969,850, expensive ferroelectric liquid crystal must be also used to provide a spatial light modulator which can be switched at high speed. Moreover, in U.S. Pat. No. 5,969,850, crosstalk occurs between a left eye image and a right eye image for the following reasons, and thus the user cannot watch an accurate 3D image.

In general, most display panels scan a frame from top to bottom. Thus, while a previous frame is being displayed at the bottom of the screen, the next frame is displayed at the top of the screen. As illustrated in FIG. 3, a right eye image is displayed on the entire screen at time 0, and a left eye image is displayed on the entire screen at time T, where T is the time required to completely scan one frame. However, since the right eye image is continually changing to the left eye image between time 0 and time T, the left eye image is displayed at the top of the screen and at the same time the right eye image is displayed at the bottom of the screen. As a result, there exists a period when the left eye image and the right eye image share the screen. Therefore, as in U.S. Pat. No. 5,969,850, when the cells 24 and 25 of the spatial light modulator 22 are simply alternately turned on and off, the left eye image and the right eye image may not be completely separated and sensed by the left eye and the right eye of the user at the same time.

SUMMARY OF THE INVENTION

The present invention provides a high resolution 2D-3D switchable autostereoscopic display apparatus that mitigates the degradation of the resolution and reduces crosstalk.

The present invention also provides a high resolution 2D-3D switchable autostereoscopic display apparatus which is structurally simple and does not require expensive components.

According to an aspect of the present invention, there is provided a stereoscopic display apparatus comprising: a backlight unit emitting light; a polarizer sheet changing the light emitted from the backlight unit so that the light has only a specific polarization direction; a polarization switch converting the direction of the polarization of incident light; a birefringent element array comprising a plurality of alternating first and second birefringent elements and changing the polarization direction of incident light so that the polarization of light transmitted by the first birefringent elements is perpendicular to the polarization of light transmitted by the second birefringent elements; a lenticular lens sheet separating and emitting incident light to a first eye viewing zone and a second eye viewing zone; and a display panel displaying an image.

The polarization switch is switched between first through third states in which the polarization directions of transmitted light differ from one another. In other words, the polarization switch is switched between the first state where the polarization direction of the incident light is not changed, the second state where the polarization of the incident light is changed into a circular polarization, and the third state where the polarization of incident light is changed by 90 degrees.

The polarization switch is a liquid crystal retarder which is electrically controllable.

The birefringent element array comprises a plurality of first and second vertical birefringent elements that alternate along a horizontal direction.

The first and second birefringent elements may be polarizers having predetermined polarization planes, and the polarization plane of the polarizer of the first birefringent element is perpendicular to the polarization panel of the polarizer of the second birefringent element.

The first and second birefringent elements may be retarders which delay the incident light by a predetermined phase, and the difference between the phase delays of the retarders of the first and second birefringent elements is $\lambda/2$.

The first and second birefringent elements may be rotators which rotate the incident light by a predetermined angle, and the difference between the rotation angles of the rotators of the first and second birefringent elements is 90 degrees.

When the polarization switch is in the first state, the polarization direction of the light transmitted by the first birefringent elements is perpendicular to the polarization plane at an incident side of the LCD panel, and the polarization direction of the light transmitted by the second birefringent elements is parallel to the polarization plane at the incident side of the LCD panel.

When the polarization switch is in the third state, the polarization direction of the light transmitted by the first birefringent elements is parallel to the polarization plane at the incident side of the LCD panel and the polarization direction of the light transmitted by the second birefringent elements is perpendicular to the polarization plane at the incident side of the LCD panel.

When the polarization switch is in the second state, the light transmitted by the first and second birefringent elements is circularly polarized, or linearly polarized at 45 degree with respect to the polarization plane at the incident side of the LCD panel The lenticular lens sheet may comprise a plurality of vertical lenticular lenses which are parallel to the birefringent elements of the birefringent element array and arranged in a horizontal direction. In this case, a pitch between the lenses of the lenticular lens sheet is equal to or less than a pitch between every two adjacent first birefringent elements of the birefringent element array or a pitch between every two adjacent second birefringent elements of the birefringent element array.

The distance between the lenticular lens sheet and the birefringent element array is equal to or greater than the focal distance of each of the lenticular lenses.

The lenticular lens sheet transmits the light transmitted by the first birefringent elements to the first eye viewing zone and the light transmitted by the second birefringent elements to the second eye viewing zone.

The backlight unit and the polarization switch are each divided into a plurality of horizontal segments which are sequentially switched in synchronization with the vertical scanning time of the LCD panel.

The backlight unit and the polarization switch are each divided into a plurality of horizontal segments which can be switched independently and arranged in a vertical direction, and the number of segments of the backlight unit is equal to the number of segments of the polarization switch.

The corresponding segments of the backlight unit and the polarization switch are switched at the same time.

Each of the horizontal segments of the backlight unit and the polarization switch corresponds to a plurality of pixel lines of the LCD panel.

Each horizontal segment of the polarization switch is in the first state when the corresponding pixel lines of the LCD panel display a right eye image and in the third state when the corresponding pixel lines of the LCD panel display a left eye image.

Each horizontal segment of the polarization switch is switched to the first state when the first pixel line of the corresponding pixel lines of the LCD panel starts to display a right eye image and to the third state when the first pixel line of the corresponding pixel lines of the LCD panel starts to display a left eye image.

Each horizontal segment of the backlight unit are turned on while all of the corresponding pixel lines are displaying a right eye image or a left eye image and turned off while the corresponding pixel lines are converting between the left and right eye images.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 4:
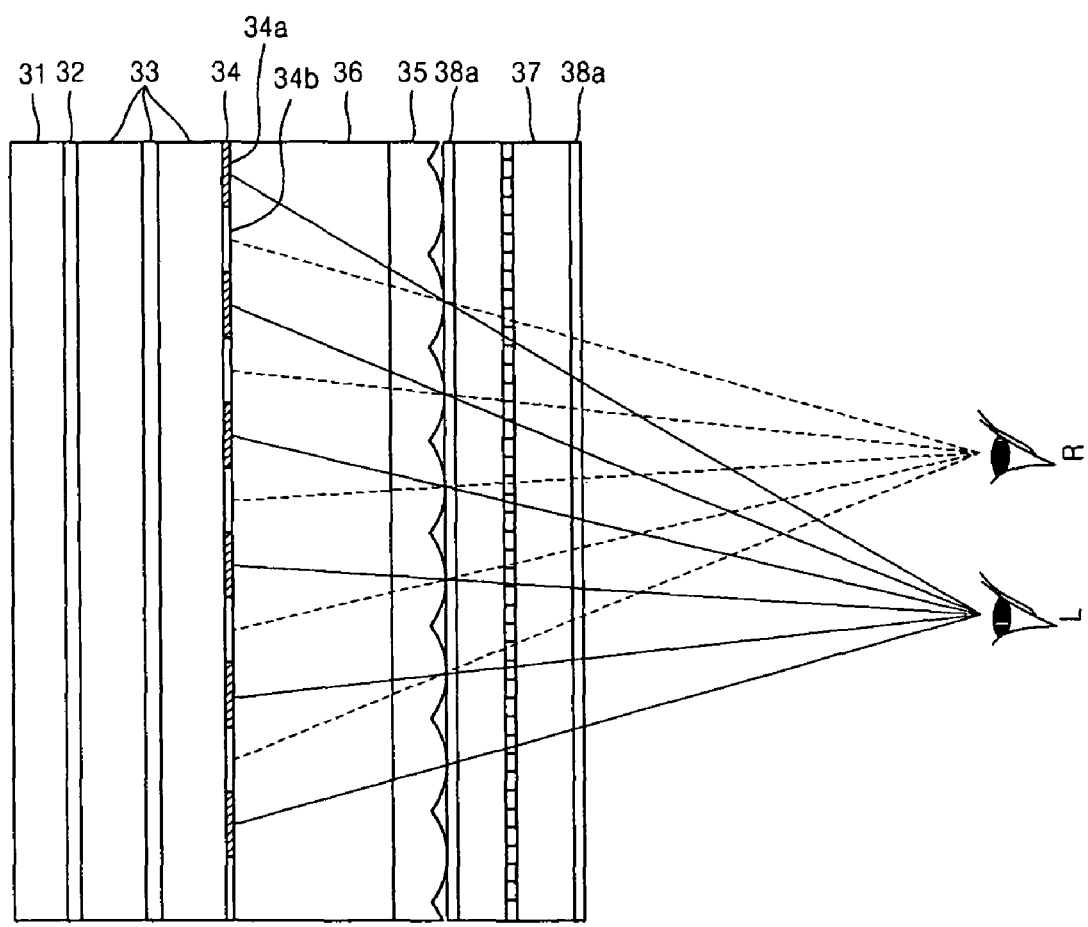
FIG. 4 is a schematic view of a 2D-3D switchable image display apparatus according to an exemplary embodiment of the present invention.

FIG. 4 is a schematic view of a high resolution 2D-3D switchable autostereoscopic display apparatus 30 according to an exemplary embodiment of the present invention.

Referring to FIG. 4, the high resolution 2D-3D autostereoscopic display apparatus 30 includes a backlight unit 31, a polarizer sheet 32 transmitting only light with a predetermined polarization component among the light emitted from the backlight unit 31, a polarization switch 33 converting the polarization direction of the incident light according to electric control, a birefringent element array 34 formed of a plurality of alternating first and second birefringent elements 34a and 34b that change the polarization directions of the incident lights, a lenticular lens sheet 35 separating the incident light into a left eye viewing zone and a right eye viewing zone, and a liquid crystal display (LCD) panel 37 displaying an image.

As is well known in the art, the LCD panel 37 includes polarizer sheets 38a and 38b formed on an incident surface and an exit surface, respectively, of the LCD panel 37. According to the present exemplary embodiment, as in a conventional high resolution 3D image display apparatus, the LCD panel 37 alternately displays a right eye image and a left eye image in a 3D mode according to time. Accordingly, a fast response LCD panel having a refresh rate greater than 120 Hz may be used as the LCD panel 37 so that the user can see the right eye image and the left eye image without flickering.

According to the present exemplary embodiment, the polarization switch 33 may be switched among first through third states in which the polarization directions of the lights transmitted by the polarization switch 33 differ from one another by 45 degrees. For example, the polarization switch 33 may be in a first state in which the polarization direction of incident light is not changed, in a second state in which the polarization direction of incident light is changed by 45 degrees, and in a third state in which the polarization direction of incident light is changed by 90 degrees. The angles by which the polarization directions of incident lights are changed in the above-described respective states are exemplary and may vary according to the directions of polarization planes of the polarizer sheet 32, the birefringent element array 34, and the LCD panel 37. It is satisfactory that the polarization directions of the transmitted lights in the first through third states differ by 45-degree increments. The polarization switch 33 is an electrically controllable device having three anisotropic states depending on the magnitude of an applied voltage. For example, the polarization switch 33 may be an electrically controllable liquid crystal retarder. When the polarization switch 33 is a liquid crystal retarder, for example, the phase of incident light is not delayed in the first state, and the phase of incident light is delayed by a quarter wave ($\lambda/4$) in the second state, and the phase of incident light is delayed by a half wave ($\lambda/2$) in the third state.

As illustrated in FIG. 4, the birefringent element array 34 includes a plurality of horizontally alternating first and second birefringent elements 34a and 34b. Though not illustrated in FIG. 4, the first and second birefringent elements 34a and 34b extend vertically and are alternately arranged horizontally in the high resolution 2D-3D switchable autostereoscopic display apparatus 30. According to the present exemplary embodiment, the birefringent element array 34 changes the polarization direction of the incident light so that the polarization directions of the lights transmitted by the first birefringent elements 34a are perpendicular to those of the lights transmitted by the second birefringent elements 34b.

For example, the first and second birefringent elements 34a and 34b may be polarizers having predetermined polarization planes. In this case, the polarization planes of the first birefringent elements 34a may be orthogonal to the polarization planes of the second birefringent elements 34b. Instead, the first and second birefringent elements 34a and 34b may be retarders delaying the incident light by a predetermined phase. In this case, the difference between the phase delays of the retarder of the first birefringent elements 34a and the retarder of the second birefringent elements 34b may be $\lambda/2$. For example, the first birefringent elements 34a may not delay the phase and the second birefringent elements 34b may delay the phase by $\lambda/2$, or the first birefringent elements 34a may delay the phase by $-\lambda/4$ and the second birefringent elements 34b may delay the phase by $+\lambda/4$. According to another exemplary embodiment, the first and second birefringent elements 34a and 34b may be rotators rotating the incident light at a predetermined angle. In this case, the difference between the angles by which the first birefringent elements 34a and the second birefringent elements 34b rotate light may be 90 degrees. For example, the first birefringent elements 34a may not rotate the incident light and the second birefringent elements 34b may rotate the incident light by 90 degrees, or the first birefringent elements 34a may rotate the incident light by −45 degrees and the second birefringent elements 34b may rotate the incident light by +45 degrees.

According to an exemplary embodiment of the present invention, the light which has been transmitted by the polarization switch 33 and the birefringent element array 34 may have one of the following polarization directions depending on the state of the polarization switch 33. That is, in a first case, the light transmitted by the first birefringent element 34a may be perpendicular to the polarization plane 38a at the entrance of the LCD panel 37, and the light transmitted by the second birefringent element 34b may be parallel to the polarization plane 38a at the entrance of the LCD panel 37. Alternatively, in a second case, the light transmitted by the first birefringent element 34a may be parallel to the polarization plane 38a at the entrance of the LCD panel 37 and the light transmitted by the second birefringent element 34b is perpendicular to the polarization plane 38a at the entrance of the LCD panel 37. Finally, in a third case, the lights transmitted by the first and second birefringent elements 34a and 34b may be circularly polarized or linearly polarized at an angle of 45 degrees to the polarization plane 38a at the entrance of the LCD panel 37.

The lenticular lens sheet 35 includes a plurality of vertical lenticular lenses arranged in the horizontal direction. Accordingly, the lenticular lenses extend in the vertical direction of the 3D image display apparatus 30 to be parallel to the birefringent elements 34a and 34b of the birefringent element array 34. The lenticular lens sheet 35 separates and emits incident light to a left eye viewing zone and a right eye viewing zone, and thus the light transmitted through the lenticular lens sheet 35 is imaged separately in the left eye viewing zone and the right eye viewing zone at a viewing distance according to the location on the lenticular lens sheet 35 upon which the light is incident. For example, the light emitted from the first birefringent elements 34a can be guided to the left eye viewing zone via the lenticular lens sheet 35. The light emitted from the second birefringent elements 34b can be guided to the right eye viewing zone via the lenticular lens sheet 35.

As is well known in the art, the distance between the left eye viewing zone and the right eye viewing zone at the viewing distance may be approximately 65 mm. To this end, the pitch between the lenticular lenses of the lenticular lens sheet 35 may be equal to or, preferably, slightly less than a pitch between every two adjacent first birefringent elements 34a of the birefringent element array 34 or a pitch between every two adjacent second birefringent elements 34b of the birefringent element array 34. Also, the distance between the lenticular lens sheet 35 and the birefringent element array 34 may be equal to or, preferably, slightly greater than the focal distance of each of the lenticular lenses. As illustrated in FIG. 4, a transparent substrate 36 may be placed between the lenticular lens sheet 35 and the birefringent element array 34. For example, the birefringent element array 34 and the lenticular lens sheet 35 may be attached to both surfaces of the transparent substrate 36 in order to fix the locations of the lenticular lens sheet 35 and the lenticular lens sheet 33 that are relative to each other.

The operation of the high resolution 2D-3D switchable autostereoscopic display apparatus 30 will now be described more fully according to exemplary embodiments. For simplicity of description, it is assumed that the polarizer sheet 32 has a horizontal polarization direction and the polarization plane 38a at the entrance of the LCD panel 37 has a vertical polarization direction. In addition, it is assumed that the polarization switch 33 is a liquid crystal retarder which may be in a first state in which the polarization direction of incident light is not changed, in a second state in which the polarization direction of incident light is changed by 45 degrees, and in a third state in which the polarization direction of incident light is changed by 90 degrees. Also, it is assumed that the first birefringent elements 34a are retarders that do not delay the phases and the second birefringent elements 34b are retarders that delay the phases by a half wave ($\lambda/2$).

Figure 5:
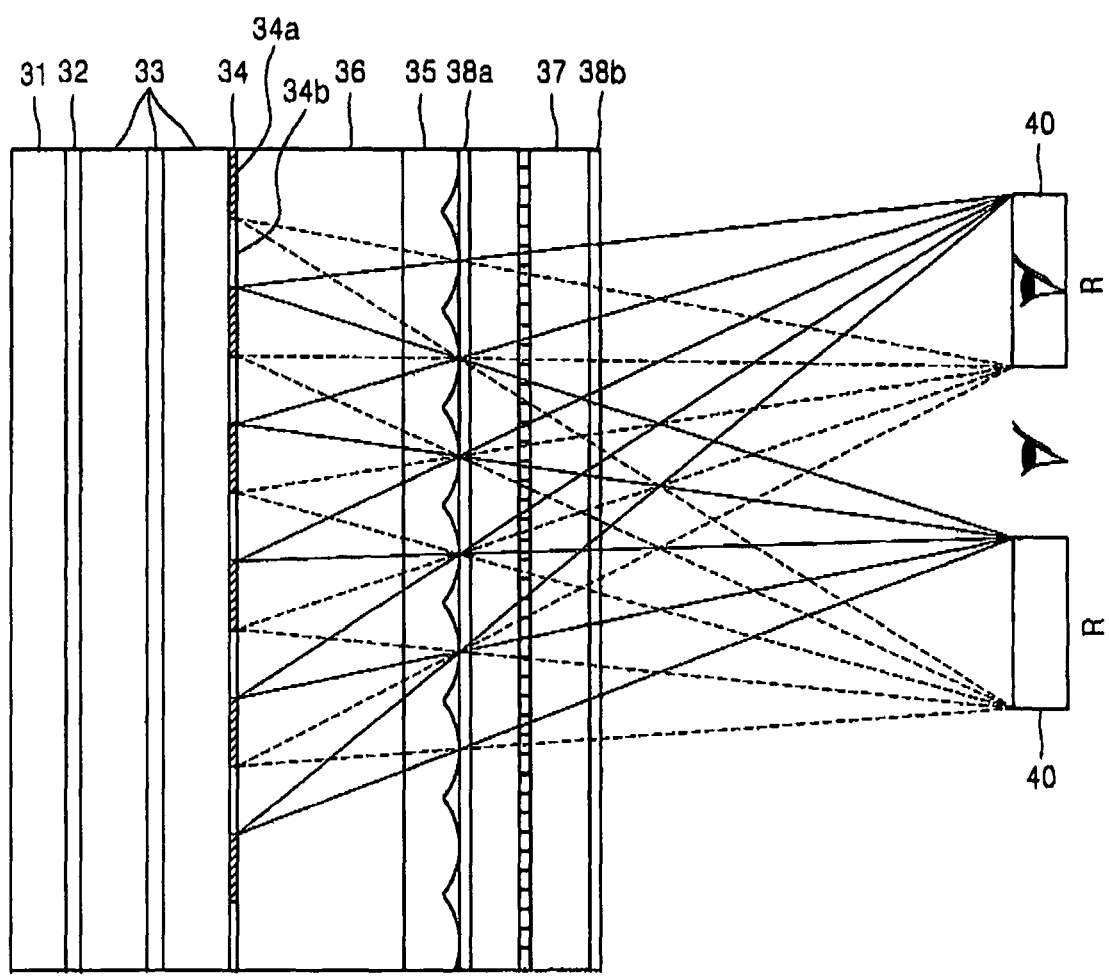
FIG. 5 illustrates a right eye image displayed in the autostereoscopic display apparatus of FIG. 4.

First, the case where the polarization switch 33 is in the first state will be described. When the polarization switch 33 is in the first state, the polarization direction of the light that is transmitted through the polarizer sheet 32 and is incident on the polarization switch 33 is not changed. Accordingly, the light transmitted by the polarization switch 33 is horizontally polarized. Then, the horizontally polarized light passes through the first and second birefringent elements 34a and 34b. The light transmitted by the first birefringent elements 34a is kept in a state of being horizontally polarized, but the polarization direction of the light transmitted by the second birefringent elements 34b is changed by 90 degrees and is thus vertically polarized. The lights transmitted by the first and second birefringent elements 34a and 34b are separated and guided by the lenticular lens sheet 35 into a left eye viewing zone and a right eye viewing zone, respectively. However, the polarization of the light transmitted by the first birefringent elements 34a is orthogonal to the polarization plane 38a at the entrance of the LCD panel 37, and thus the light transmitted by the first birefringent elements 34a is blocked. On the other hand, as illustrated in FIG. 5, the light transmitted by the second birefringent elements 34b passes through the LCD panel 37 and can be imaged on a right eye viewing zone 40 because the polarization of the light transmitted by the second birefringent elements 34b is parallel to the polarization plane 38a at the entrance of the LCD panel 37. Accordingly, when the LCD panel 37 displays the right eye image, the user senses only the right eye image through the right eye.

Figure 6:
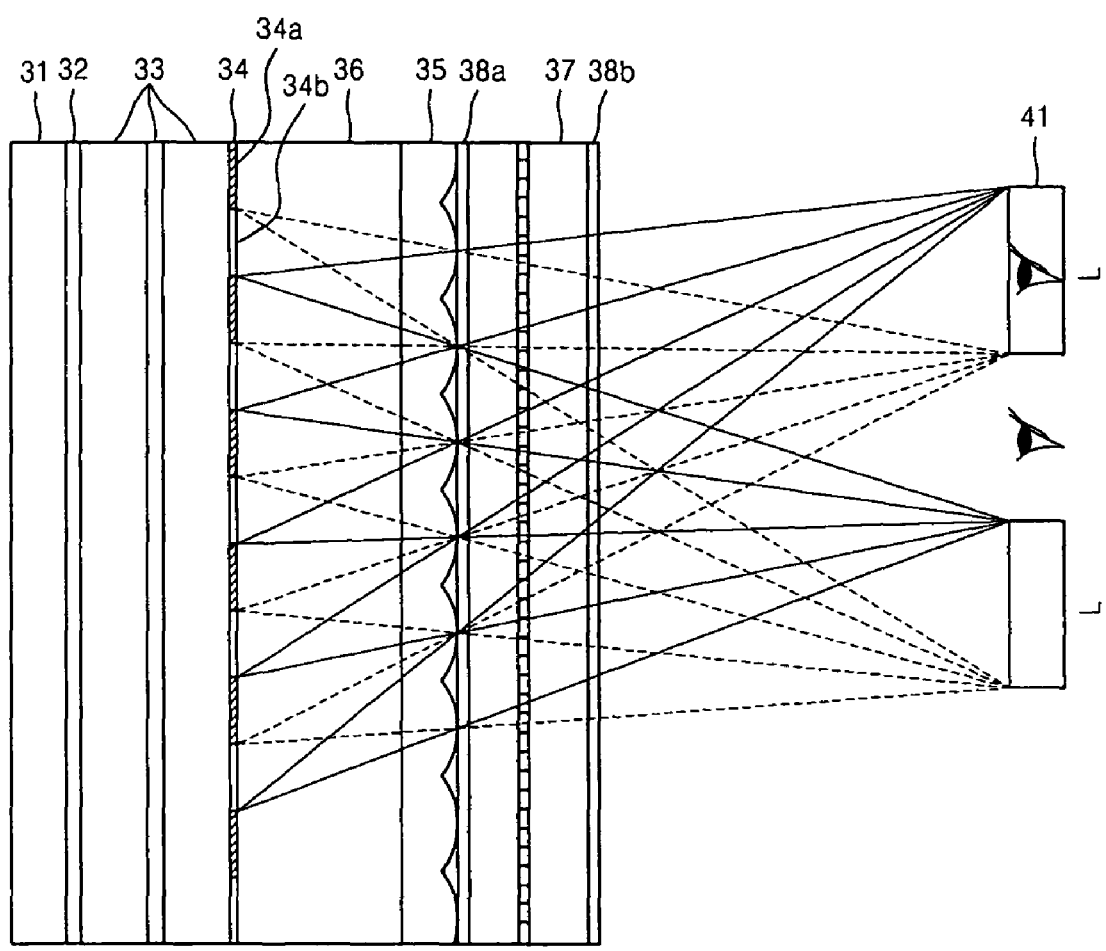
FIG. 6 illustrates a left eye image displayed in the autostereoscopic display apparatus of FIG. 4.

When the polarization switch 33 is in the third state, the polarization direction of the light incident on the polarization switch 33 via the polarizer sheet 32 is rotated by 90 degrees. Accordingly, the light transmitted by the polarization switch 33 is vertically polarized. Then, the vertically polarized light is transmitted by the first and second birefringent elements 34a and 34b. The light transmitted by the first birefringent elements 34a is kept in a state of being vertically polarized, and the polarization direction of the light transmitted by the second birefringent elements 34b is changed by 90 degrees and is thus horizontally polarized. The light transmitted by the first and second birefringent elements 34a and 34b are separated and guided by the lenticular lens sheet 35 to the left eye viewing zone and the right eye viewing zone, respectively. However, the polarization of the light transmitted by the second birefringent element 34b is perpendicular to the polarization plane 38a of the LCD panel 37, and thus the light transmitted by the second birefringent element 34b is blocked. On the other hand, as illustrated in FIG. 6, the polarization of the light transmitted by the first birefringent element 34a passes through the LCD panel 37 and can be imaged on a left eye viewing zone 41 because the light is parallel to the polarization plane 38a at the entrance of the LCD panel 37. Accordingly, when the LCD panel 37 displays the left eye image, the user senses only the left eye image through the left eye.

Accordingly, in a 3D mode, the user can see a 3D image when the polarization switch 33 is alternately switched to the first state while the LCD panel 37 displays a right eye image and to the third state while the LCD panel 37 displays a left eye image. At this time, the LCD panel 37 needs to switch between the right eye image and the left eye image at a very fast rate so that the user does not detect any flickering. Thus, as described above, the LCD panel 37 may be a fast response LCD having a refresh rate of more than 120 Hz. Also, the polarization switch 33 needs to be switched rapidly in synchronization with the LCD panel 37. Thus, the polarization switch 33 may be an electrically controllable liquid crystal retarder. Presently, liquid crystal retarders having a switching speed of about 180 Hz are available at a relatively low price.

A 2D mode can be realized in two ways. For example, the polarization switch 33 may be repetitively switched between the first state and the third state, and the LCD panel 37 displays a 2D image twice consecutively. Then, the same 2D image is sensed consecutively by the right eye and the left eye of the user, so that the user can watch a 2D image.

Alternatively, the polarization switch 33 is fixed in a second state, and the LCD panel 37 displays a 2D image at an ordinary rate. When the polarization switch 33 is in the second state, the polarization direction of the light transmitted by the polarizer sheet 32 and incident on the polarization switch 33 is converted by 45 degrees. Accordingly, the light transmitted by the polarization switch 33 has a polarization at 45 degrees. Then, the light is transmitted by the first and second birefringent elements 34a and 34b. The light transmitted by the first birefringent elements 34a maintains a 45 degree polarization and the polarization of the light transmitted by the second birefringent elements 34b is converted by 90 degrees and consequently has a 135 degree polarization. As a result, both the lights which have been transmitted by the first and second birefringent elements 34a and 34b pass through the LCD panel 37 and are imaged on both the left eye viewing zone and the right eye viewing zone. Thus, when the LCD panel 37 displays a 2D image, the user can see a 2D image through the left eye and the right eye.

When the polarization switch 33 is in the second state, the polarization direction of the light incident on the polarization switch 33 is not rotated by 45 degrees, but the polarization state of the incident light may be changed so that exit light has a circular polarization state. For example, the polarization switch 33 does not change the polarization direction of the incident light when being in the first state, changes the polarization direction of the incident light by 90 degrees when being in the third state, and changes the polarization of the incident light to a circular polarization when being in the second state. Even when the polarization of incident light is changed to a circular polarization with the polarization switch 33 in the second state, the same result as that when the polarization direction of the incident light is rotated by 45 degrees can be obtained.

As described above, a general LCD panel does not display a right eye image at one time and then a left eye image at another time but sequentially scans consecutive images from top to bottom on the screen. Accordingly, there is a period when the left eye image and the right eye image share the screen, and thus a crosstalk which is a mixture of the left eye image and the right eye image may occur.

Figure 7:
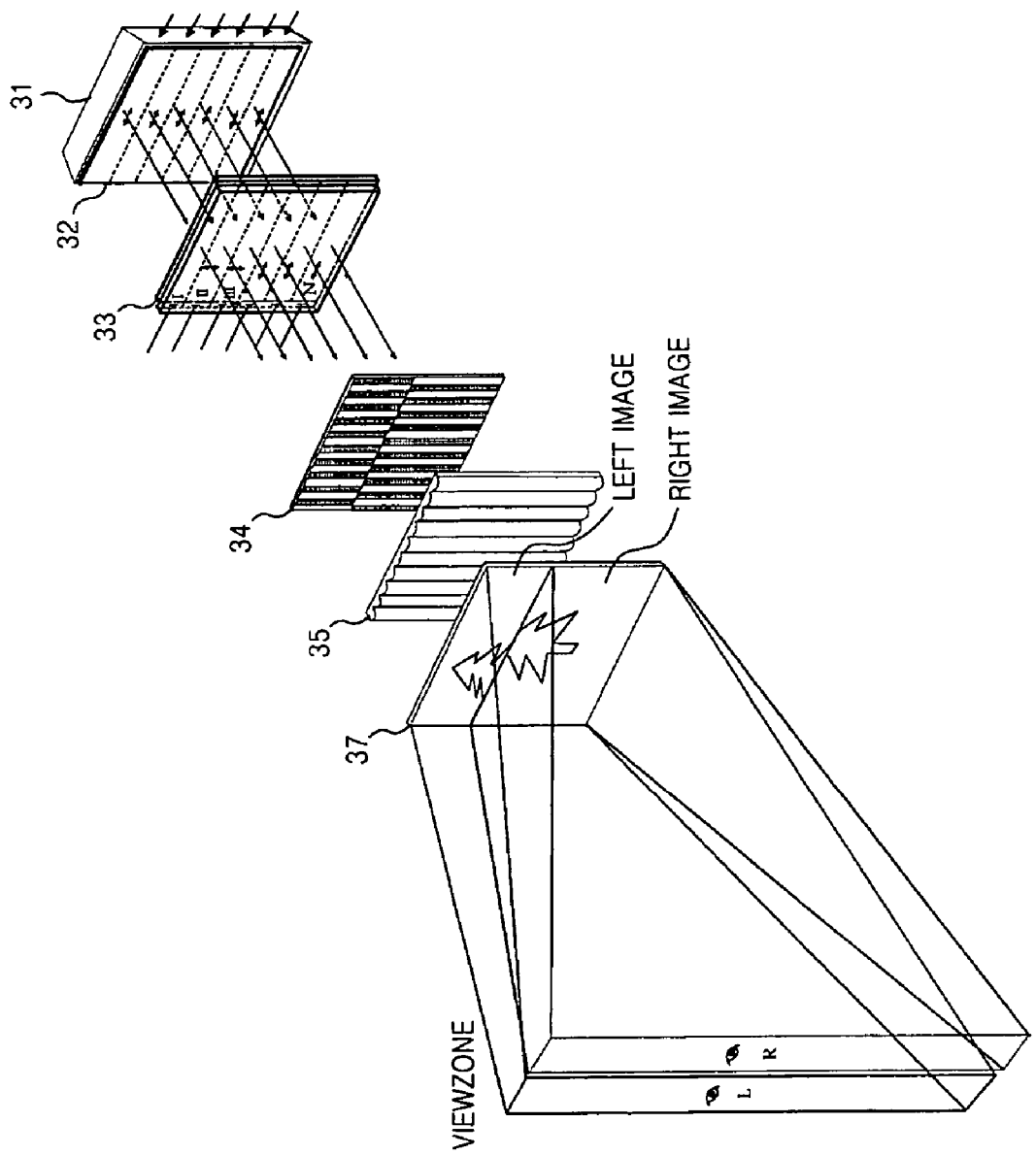
FIG. 7 is an exploded schematic view of a 2D-3D switchable image display apparatus overcomes problems caused by image scanning by a display panel, according to another exemplary embodiment of the present invention.

FIG. 7 is a schematic view of a 2D-3D switchable image display apparatus that overcomes problems caused by image scanning by a display panel, according to another exemplary embodiment of the present invention. The 3D image display apparatus illustrated in FIG. 7 has the same structure as that of the 3D image display apparatus of FIG. 4 except that the backlight unit 31 and the polarization switch 33 are each divided into N segments. In other words, the backlight unit 31 and the polarization switch 33 are each divided into a plurality of horizontal segments which are switched sequentially in synchronization with the vertical scanning time of the LCD panel 37. The segments of each of the backlight unit 31 and the polarization switch 33 may be independently switched and arranged close to each other along the vertical direction.

The number of segments of each of the backlight unit 31 and the polarization switch 33 may vary according to the design. In order to remove crosstalk completely, each of the segments of each of the backlight unit 31 and the polarization switch 33 may correspond to a pixel line of the LCD panel 37. However, this may be too costly to realize. Thus, each of the horizontal segments of each of the backlight unit 31 and the polarization switch 33 may correspond to a plurality of pixel lines of the LCD panel 37. For example, each of the segments of each of the backlight unit 31 and the polarization switch 33 may correspond to one hundred pixel lines of the LCD panel 37. The number of segments of the backlight unit 31 is preferably equal to the number of segments of the polarization switch 33.

Figure 1:
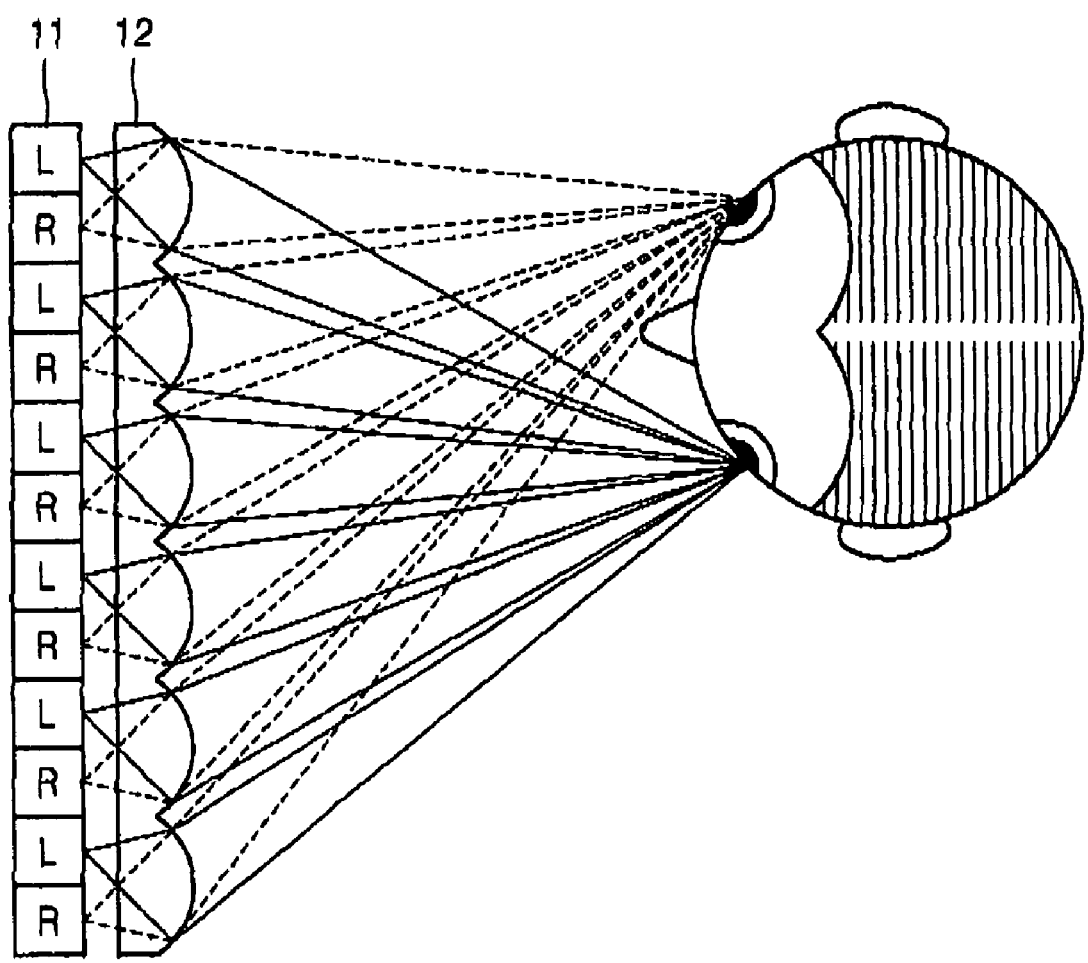
FIG. 1 is a schematic view of a related art lenticular type 3D image display apparatus.
Figure 2:
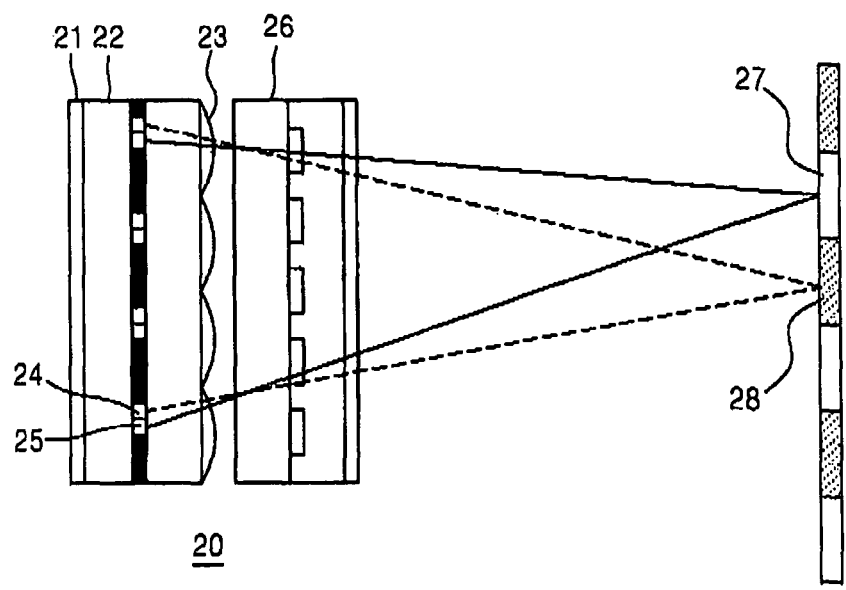
FIG. 2 is a schematic view of a related art 2D-3D switchable autostereoscopic display apparatus providing an image without a decline in resolution.
Figure 3:
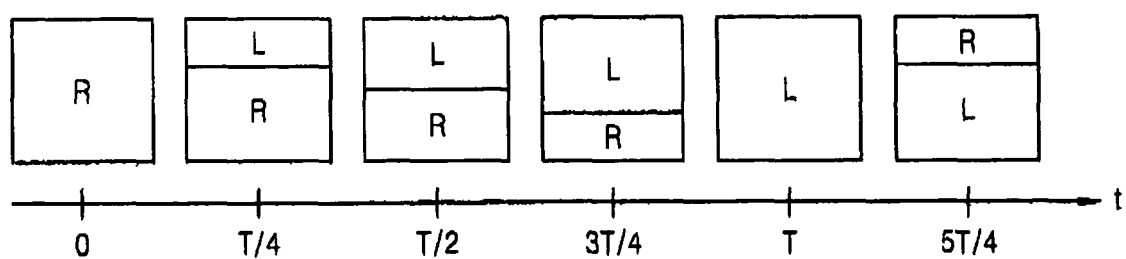
FIG. 3 illustrates a process of scanning a left eye image and a right eye image on a display panel.
Figure 8:
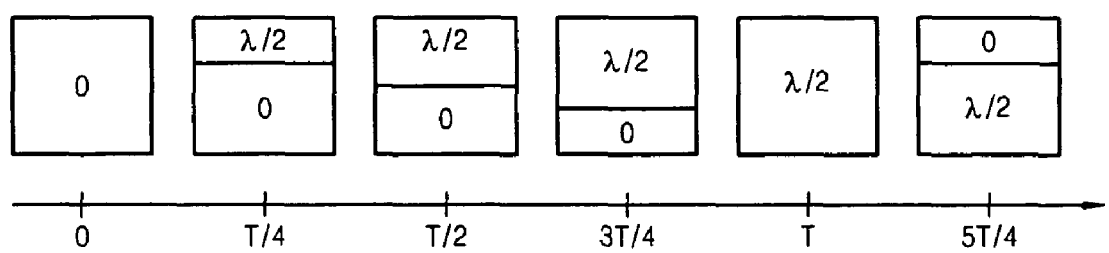
FIG. 8 illustrates an operation of a polarization switch included in the 2D-3D switchable image display apparatus of FIG. 7.

As described above, when there are an equal number of segments in the backlight unit 31 and in the polarization switch 33, the corresponding segments of the backlight unit 31 and the polarization switch 33 can be switched at the same time. In other words, each of the horizontal segments of the backlight unit 31 is flicked in synchronization with the scanning time of the corresponding pixel lines of the LCD panel 37. Also, each of the horizontal segments of the polarization switch 33 is switched to the first state when the corresponding pixel lines of the LCD panel 37 display a right eye image, and is switched to the third state when the corresponding pixel lines of the LCD panel 37 display a left eye image. FIG. 8 illustrates a switching operation of the polarization switch 33. The polarization switch 33 of FIG. 8 is divided into four segments and serves as a liquid crystal retarder that does not delay incident light when being in a first state and delays the phase of incident light by half of a wavelength λ (λ/2) when being in a third state. As illustrated in FIG. 8, when the time is 0, the polarization switch 33 is in the first state on the whole. When the time is T, the polarization switch 33 is in the third state on the whole. When the time is in between 0 and T, the state of the polarization switch 33 consecutively changes from the first state to the third state in synchronization with the LCD panel 37. The switching operation of the polarization switch 33 is controlled to accurately synchronize with an operation of alternately displaying a right eye image and a left eye image on the LCD panel 37 as illustrated in FIG. 3. As a result, even while the left eye image and the right eye image are sharing the screen of the LCD panel 37, most of the left eye image is transmitted to the left eye, and most of the right eye image is transmitted to the right eye. Hence, even while the left eye image and the right eye image are sharing the screen of the LCD panel 37, crosstalk hardly occurs.

Figure 9:
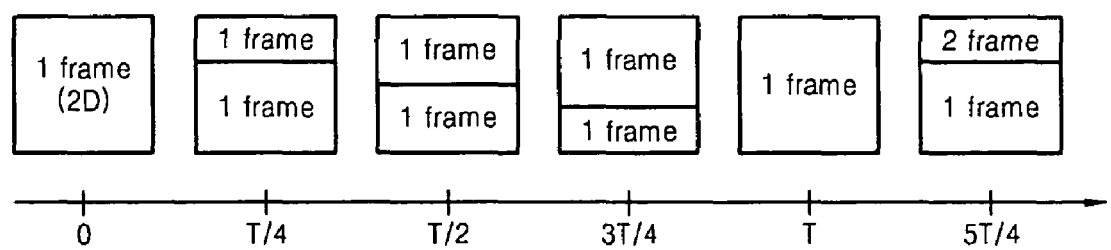
FIG. 9 illustrates an image scanning operation when a display panel displays a two-dimensional image, according to an exemplary embodiment of the present invention.

When the stereoscopic image display apparatus of FIG. 7 is in a 2D mode, the LCD panel 37 displays two identical 2D image frames consecutively as illustrated in FIG. 9 and then displays the next 2D image frame. At this time, the polarization switch 33 switches between the first state and the third state in a scanning manner in synchronization with the LCD panel 37 as illustrated in FIG. 8. Then, an identical 2D image is sensed consecutively by the right eye and the left eye of a user, so that the user can view a 2D image.

The operations of the backlight unit 31 and the polarization switch 33 will now be described in greater detail. When considering the fact that a segment of each of the backlight unit 31 and the polarization switch 33 corresponds to a plurality of pixel lines, in order to minimize crosstalk, the backlight unit 31 and the polarization switch 33 may be driven as described below.

Figure 10:
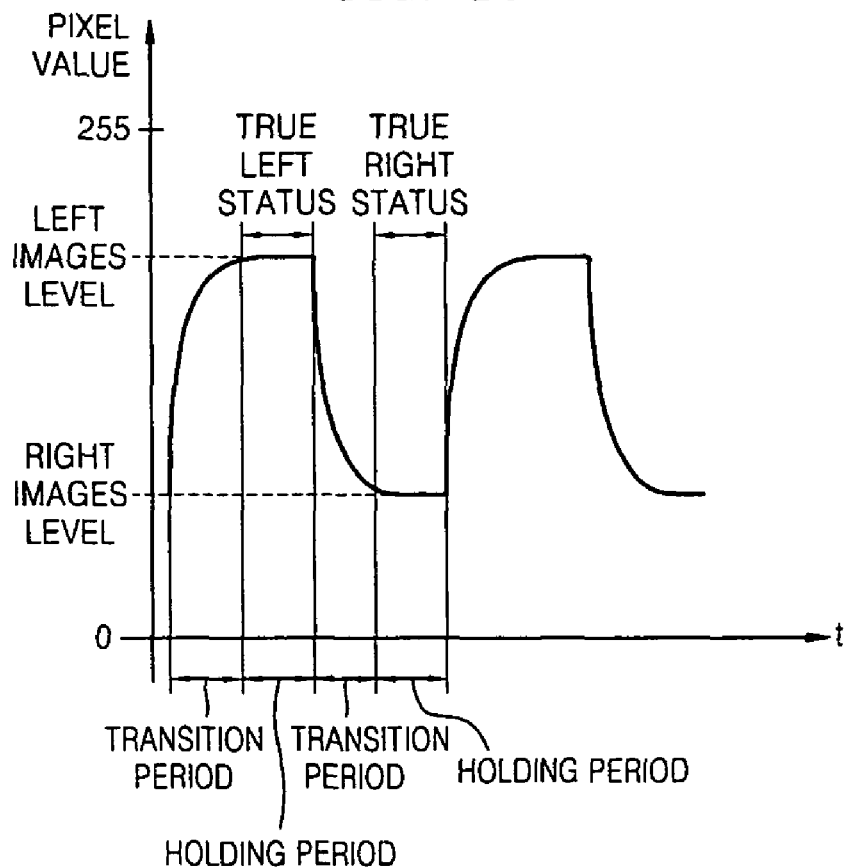
FIG. 10 is a graph showing a change in pixel values of a pixel line according to time.

FIG. 10 is a graph showing a change in pixel values of a pixel line of the LCD panel 37 according to time. As illustrated in FIG. 10, each pixel line is switched sequentially between the pixel values corresponding to the left eye image and the right eye image. As the graph of FIG. 10 shows, the left eye image and the right eye image in each pixel line do not change instantly, but require a predetermined time. In other words, after a predetermined period of time after the start of display, a complete left eye image or right eye image is displayed in each pixel line. Accordingly, left and right eye images are mixed during a transition period when the left eye image is converted to the right eye image or the right eye image is converted to the left eye image, and thus it is desirable that the segment of the backlight unit 31 corresponding to the pixel line corresponding to the transition period is turned off.

Figure 11:
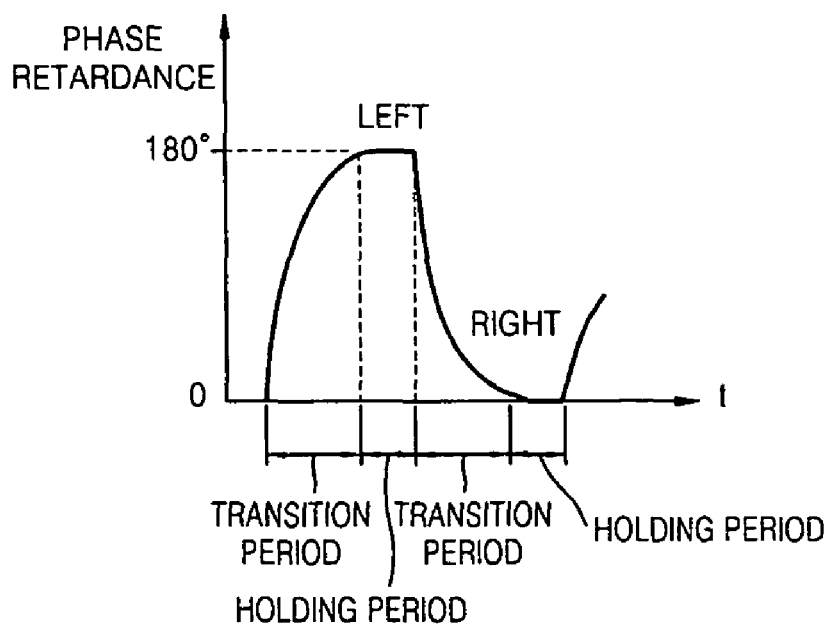
FIG. 11 is a graph showing the switching operation of a polarization switch included in the 2D-3D switchable image display apparatus of FIG. 4, according to time.

FIG. 11 is a graph showing the switching operation of a liquid crystal retarder used as the polarization switch 33 according to time. As illustrated in the graph of FIG. 11, the conversion of the polarization switch 33 from the first state (where the phase delay angle is 0 degree) to the third state (where the phase delay angle is 180 degrees, that is, a half wave) does not occur immediately but requires a predetermined time. In other words, the polarization switch 33 completely switches from the first state to the third state after the lapse of a transition period after switching has started. If the polarization switch 33 and the LCD panel 37 operate at the same speed, the transition speed of the state of the polarization switch 33 and the image transition speed of the LCD panel 37 may be almost the same. Accordingly, the state of a segment of the polarization switch 33 starts to convert at the point in time when the image displayed on the corresponding pixel line of the LCD panel 37 starts to be converted into a left eye image or a right eye image.

Figure 12:
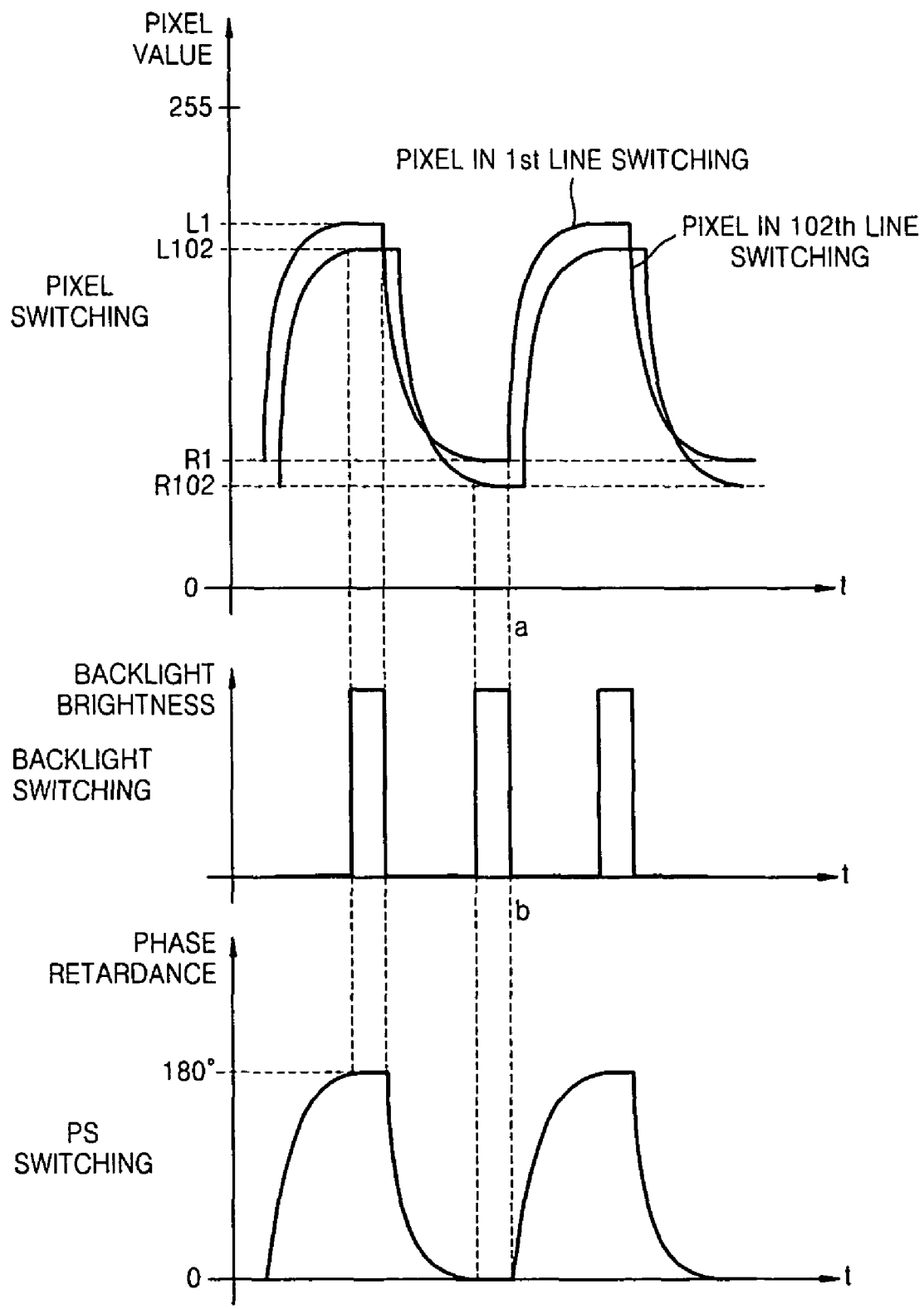
FIG. 12 is a graph showing the operations of a segment of a backlight unit and the polarization switch which are included in the 2D-3D switchable image display apparatus of FIG. 4 and each have a plurality of segments.

Accordingly, a segment of the polarization switch 33 and a corresponding segment of the backlight unit 31 can operate as illustrated in the graphs of FIG. 12. The graph at the top of FIG. 12 shows the change in pixel values of the pixel lines of the LCD panel 37 that correspond to the segments of the polarization switch 33 and the backlight unit 31. For example, it is assumed that one segment corresponds to 102 pixel lines. As the LCD panel 37 scans an image from top to bottom in a sequence, as illustrated in FIG. 12, there is a slight delay among the pixel value variation lines of the first through $102^{nd}$ pixel lines. In this case, as illustrated in FIG. 12, in order to minimize crosstalk, the segment of the backlight unit 31 is turned on when the $102^{nd}$ pixel line starts to completely display a left eye image and then turned off when the first pixel line finishes to completely display the left eye image. That is, each of the segments of the backlight unit 31 can perform a pulse operation, that is, can be turned on only while all of the corresponding pixel lines are displaying right eye images or left eye images and turned off while the left and right eye images are being switched.

On the other hand, as illustrated in FIG. 12, each of the horizontal segments of the polarization switch 33 is switched when the first pixel line of the corresponding pixel lines of the LCD panel 37 is converted to a right eye image or a left eye image. For example, each segment of the polarization switch 33 is switched to the first state when the first pixel line starts to display a right eye image, and is switched to the third state when the first pixel line starts to display a left eye image.

Figure 13:
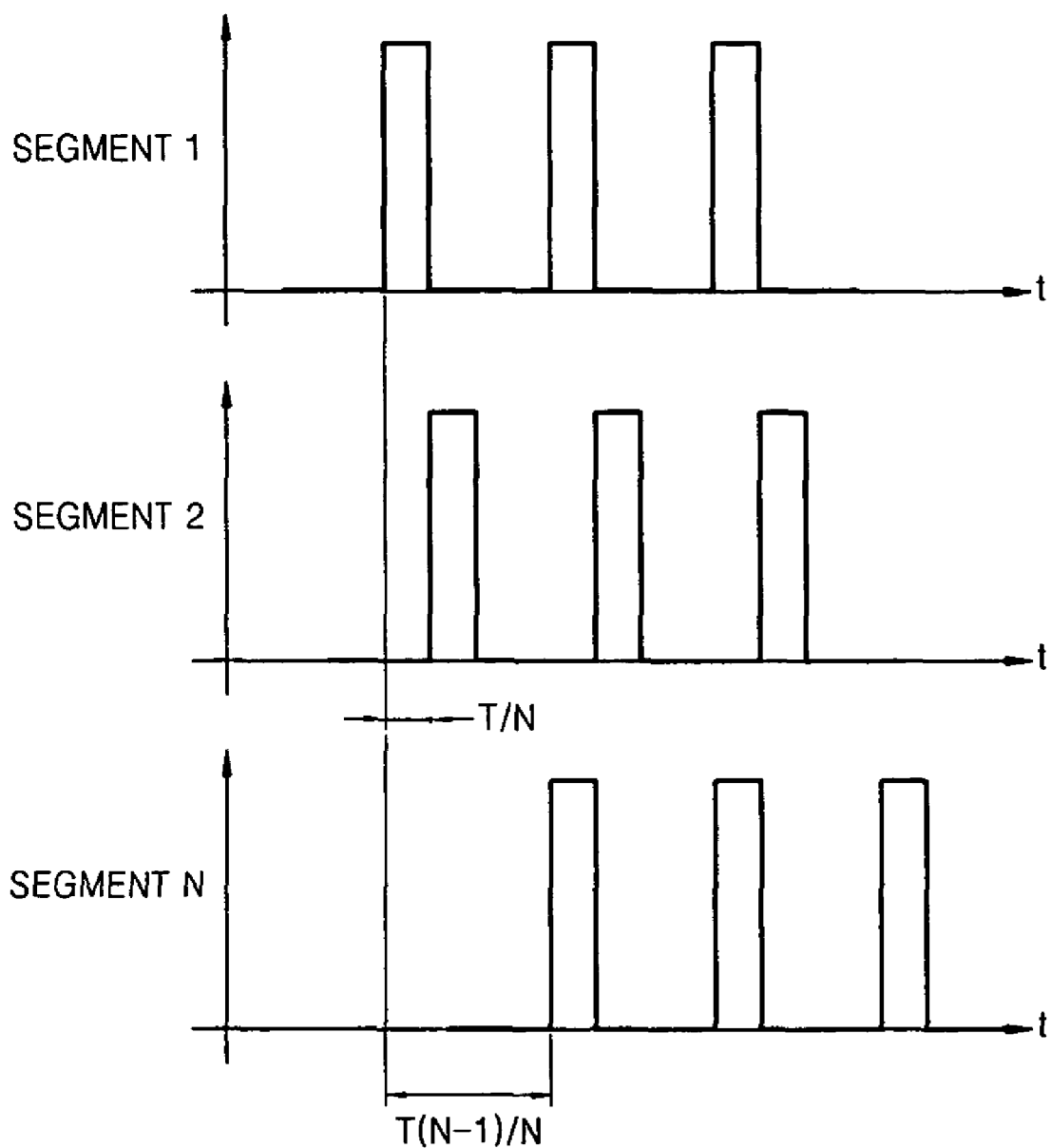
FIGS. 13 and 14 illustrate the operations of the segments of the backlight unit and those of the polarization switch, respectively.
Figure 14:
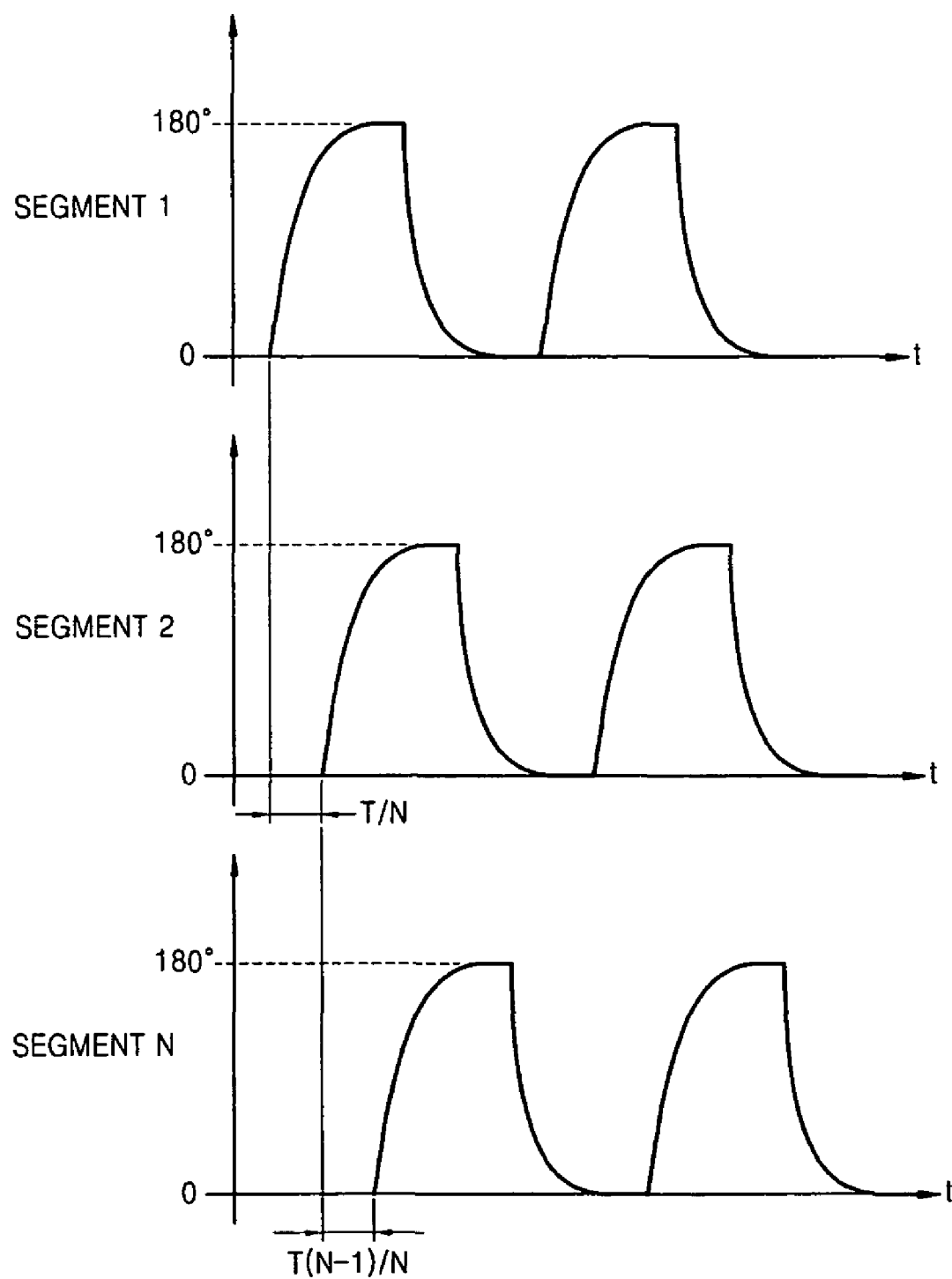

FIG. 13 illustrates the sequential operations of a plurality of segments of the backlight units 31, and FIG. 14 illustrates the sequential operations of a plurality of segments of the polarization switch 33. As described above, the segments of the backlight unit 31 and the polarization switch 33 are arranged along the vertical direction, and the LCD panel 37 scans an image from top to bottom. Thus, as illustrated in FIGS. 13 and 14, the segments of the backlight unit 31 and the polarization switch 33 are sequentially operated from top to bottom in synchronization with the vertical scanning time of the LCD panel 37.

When the principle of the above-described stereoscopic display apparatus is applied, a 2D image and a 3D image can be displayed simultaneously on a single display panel.

Figure 15:
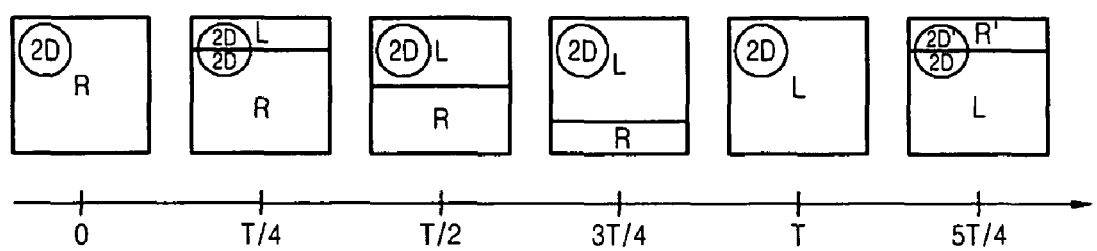
FIGS. 15 and 16 illustrate simultaneous display of a two-dimensional image and a three-dimensional image by a display panel.

FIG. 15 illustrates an operation of the LCD panel 37 according to time when a 3D image is displayed as a main image and at the same time a smaller 2D image is displayed as a supplementary image. In FIG. 15, the 2D image as the supplementary image is displayed in the shape of a circle on the left top portion of the LCD panel 37. However, the location, shape, and size of the supplementary image are not limited to those illustrated in FIG. 15.

Referring to FIG. 15, a 2D image 2D together with a right eye image R is displayed as a first frame at time 0. At this time, the polarization switch 33 switches between the first and third states in synchronization with the LCD panel 37. Hence, the right eye image R and the 2D image 2D are both transmitted to the right eye of a viewer. Thereafter, between time T/4 and time 3T/4, display of a left eye image L starts from the upper portion of the screen. As illustrated in FIG. 15, the left eye image L also includes a 2D image 2D as a supplementary image. According to the principle of the present invention, the right eye image R and the 2D image 2D on the lower portion of the screen are still transmitted to the right eye of the viewer. The left eye image L and the 2D image 2D on the upper portion of the screen are both transmitted to the left eye of the viewer. The 2D image 2D included in the left eye image L is of the same frame as that of the 2D image 2D included in the right eye image R. In other words, as in the above-described way of displaying a 2D image, an identical 2D image frame is displayed twice. Accordingly, the viewer senses the circle on the left top portion of the screen of FIG. 15 two-dimensionally and senses the rest of the screen three-dimensionally.

As illustrated in FIG. 15, at time T, the left eye image L is displayed on the entire area of the screen, and simultaneously the 2D image 2D is partially displayed on the left top portion of the screen. Both the left eye image L and the 2D image 2D are sensed by the left eye of the viewer. Thereafter, at time 5T/4, display of a right eye image R' as a second frame starts from the upper portion of the screen. The right eye image R' includes a 2D image 2D' of the second frame which is different from the 2D image 2D. In this way, it is possible that a 3D image is displayed as a main image and at the same time a smaller 2D image is displayed as a supplementary image.

Figure 16:
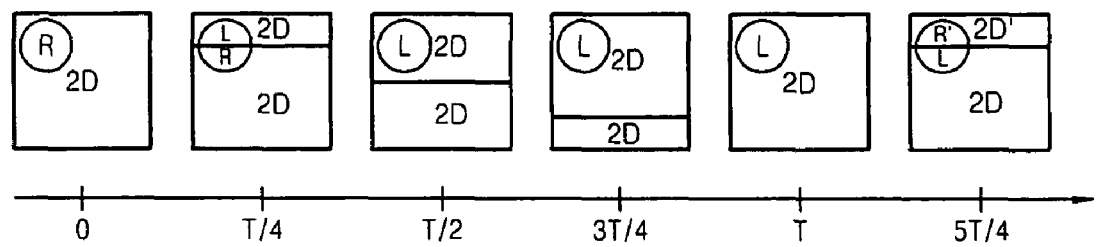

FIG. 16 illustrates an operation of the LCD panel 37 according to time when a 2D image is displayed as a main image and at the same time a smaller 3D image is displayed as a supplementary image. In FIG. 16, the 3D image as the supplementary image is displayed in the shape of a circle on the left top portion of the LCD panel 37. However, the location, shape, and size of the 3D supplementary image are not limited to those illustrated in FIG. 16.

Referring to FIG. 16, a small right eye image R together with a 2D image 2D is displayed as a first frame at time 0. At this time, similar to the case of FIG. 15, the polarization switch 33 switches between the first and third states in synchronization with the LCD panel 37. Hence, the right eye image R and the 2D image 2D are both transmitted to the right eye of a viewer. Thereafter, between time T/4 and time 3T/4, the 2D image 2D of the first frame at time 0 is re-displayed by starting from the upper portion of the screen. In other words, as in the above-described way of displaying a 2D image, an identical 2D image frame is displayed twice. As illustrated in FIG. 16, the 2D image 2D on the left top portion of the screen includes a left eye image L. Due to the switching operation of the polarization switch 33, the right eye image R and the 2D image 2D on the lower portion of the screen are still transmitted to the right eye of the viewer, while the left eye image L and the 2D image 2D on the upper portion of the screen are transmitted to the left eye of the viewer. Accordingly, the viewer senses the circle on the left top portion of the screen of FIG. 6 three-dimensionally and senses the rest of the screen two-dimensionally.

As illustrated in FIG. 16, at time T, the 2D image 2D is displayed on the entire area of the screen, and simultaneously the left eye image L is partially displayed on the left top portion of the screen. Both the left eye image L and the 2D image 2D are sensed by the left eye of the viewer. Thereafter, at time 5T/4, display of a 2D image 2D' as a second frame starts from the upper portion of the screen. The 2D image 2D' includes a right eye image R' of the second frame which is different from the right eye image R.

In this way, it is possible that a 2D image is displayed as a main image and at the same time a smaller 3D image is displayed as a supplementary image.

Up to now, the structures and operation of the high resolution 2D-3D switchable autostereoscopic display apparatuses according to exemplary embodiments of the present invention have been described. As described above, in the present invention, a polarization switch such as a liquid crystal retarder, which can be switched fast and provided at a relatively a low price, is used. Thus, an autostereoscopic display apparatus according to the present invention can be structured relatively easily and at low cost.

Moreover, a backlight unit and a polarization switch included in the autostereoscopic display apparatus according to the present invention are each divided into a plurality of segments. Each of the segments operates in synchronization with the vertical scanning time of the LCD panel, and thus, crosstalk rarely occurs.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A stereoscopic display apparatus comprising:
   a backlight unit which emits light;
   a polarizer sheet which transmits only light with a predetermined polarization component among the light emitted from the backlight unit;
   a polarization switch which converts a polarization direction of incident light transmitted by polarization sheet;
   a birefringent element array comprising a plurality of alternating first and second birefringent elements which change the polarization direction of incident light transmitted by the polarization switch so that a polarization direction of light transmitted by the first birefringent elements is perpendicular to a polarization direction of light transmitted by the second birefringent elements;
   a lenticular lens sheet which separates and emits incident light transmitted by the birefringent element array to a first eye viewing zone and a second eye viewing zone; and
   a display panel which displays an image.

2. The stereoscopic display apparatus of claim 1, wherein the polarization switch is switched between first, second and third states, and the polarization direction of the transmitted light differs in the first, second and third states.

3. The stereoscopic display apparatus of claim 2, wherein the polarization switch is switched between the first state where the polarization direction of the incident light is not changed, the second state where the polarization direction of the incident light is changed into a circular polarization, and the third state where the polarization direction of the incident light is changed by 90 degrees.

4. The stereoscopic display apparatus of claim 2, wherein the polarization switch comprises a liquid crystal retarder which is electrically controllable.

5. The stereoscopic display apparatus of claim 1, wherein the first and second birefringent elements extend vertically and are alternately arranged in a horizontal direction.

6. The stereoscopic display apparatus of claim 5, wherein the first and second birefringent elements comprise polarizers having predetermined polarization planes and the polarization plane of the polarizers of the first birefringent element is perpendicular to the polarization plane of the polarizers of the second birefringent element.

7. The stereoscopic display apparatus of claim 5, wherein the first and second birefringent elements comprise retarders which delay the incident light by a predetermined phase, and a difference between phase delays of the retarders of the first and second birefringent elements is $\lambda/2$.

8. The stereoscopic display apparatus of claim 5, wherein the first and second birefringent elements comprise rotators which rotate the incident light by a predetermined angle, and a difference between rotation angles of the rotators of the first and second birefringent elements is 90 degrees.

9. The stereoscopic display apparatus of claim 5, wherein, if the polarization switch is in the first state, the polarization direction of the light transmitted by the first birefringent elements is perpendicular to a polarization plane at an incident side of the display panel, and the polarization direction of the light transmitted by the second birefringent elements is parallel to the polarization plane at the incident side of the display panel.

10. The stereoscopic display apparatus of claim 9, wherein, if the polarization switch is in the third state, the polarization direction of the light transmitted by the first birefringent elements is parallel to the polarization plane at the incident side of the display panel and the polarization direction of the light transmitted by the second birefringent elements is perpendicular to the polarization plane at the incident side of the display panel.

11. The stereoscopic display apparatus of claim 10, wherein, if the polarization switch is in the second state, the light transmitted by the first and second birefringent elements is circularly polarized, or linearly polarized at 45 degree with respect to the polarization plane at the incident side of the display panel.

12. The stereoscopic display apparatus of claim 5, wherein the lenticular lens sheet comprises a plurality of vertical lenticular lenses which are parallel to the first and second birefringent elements of the birefringent element array and arranged in a horizontal direction.

13. The stereoscopic display apparatus of claim 12, wherein a pitch between the vertical lenticular lenses of the lenticular lens sheet is equal to or less than a pitch between every two adjacent first birefringent elements of the birefringent element array or a pitch between every two adjacent second birefringent elements of the birefringent element array.

14. The stereoscopic display apparatus of claim 12, wherein a distance between the lenticular lens sheet and the birefringent element array is equal to or greater than a focal distance of each of the vertical lenticular lenses.

15. The stereoscopic display apparatus of claim 12, wherein the lenticular lens sheet transmits the light transmitted by the first birefringent elements to the first eye viewing zone and the light transmitted by the second birefringent elements to the second eye viewing zone.

16. The stereoscopic display apparatus of claim 1, wherein each of the backlight unit and the polarization switch are divided into a plurality of horizontal segments which are sequentially switched in synchronization with a vertical scanning time of the display panel.

17. The stereoscopic display apparatus of claim 16, wherein each of the horizontal segments of the backlight unit and the polarization switch corresponds to a plurality of pixel lines of the display panel.

18. The stereoscopic display apparatus of claim 17, wherein each horizontal segment of the polarization switch is in the first state if corresponding pixel lines of the display panel display a right eye image and in the third state if the corresponding pixel lines of the display panel display a left eye image.

19. The stereoscopic display apparatus of claim 18, wherein each horizontal segment of the polarization switch is switched to the first state if a first pixel line of the corresponding pixel lines of the display panel starts to display the right eye image and to the third state if the first pixel line of the corresponding pixel lines of the display panel starts to display the left eye image.

20. The stereoscopic display apparatus of claim 17, wherein each horizontal segment of the backlight unit are turned on while all of the corresponding pixel lines are displaying the right eye image or the left eye image and turned off while the corresponding pixel lines are converting between the left and right eye images.

21. The stereoscopic display apparatus of claim 16, wherein the display panel alternately and sequentially displays a right eye image and a left eye image in a three-dimensional mode.

22. The stereoscopic display apparatus of claim 21, wherein each of the horizontal segments of the polarization switch is switched to the first state if corresponding pixel lines of the display panel display the right eye image, to the third state if the corresponding pixel lines of the display panel display the left eye image, and to the second state if the display panel is in a two-dimensional mode.

23. The stereoscopic display apparatus of claim 16, wherein the display panel displays two identical two-dimensional images consecutively in a two-dimensional mode and then displays a next two-dimensional image.

24. The stereoscopic display apparatus of claim 23, wherein each of the horizontal segments of the polarization switch is alternately switched between the first state and the third state in synchronization with the display panel.

25. The stereoscopic display apparatus of claim 16, wherein the two-dimensional panel displays a two-dimensional image and a three-dimensional image at the same time.

26. The stereoscopic display apparatus of claim 25, wherein two identical dimensional images are consecutively displayed on a portion of the display panel and are followed by a next 2D image, and a right eye image and a left eye image are sequentially displayed on the remaining portion of the display panel.

27. The stereoscopic display apparatus of claim 26, wherein each of the horizontal segments of the polarization switch is alternately switched between the first state and the third state in synchronization with the display panel.

28. The stereoscopic display apparatus of claim 1, wherein each of the backlight unit and the polarization switch are divided into a plurality of horizontal segments which can be switched independently and arranged in a vertical direction, and a number of segments of the backlight unit is equal to a number of segments of the polarization switch.

29. The stereoscopic display apparatus of claim 28, wherein the corresponding segments of the backlight unit and the polarization switch are switched at the same time.

30. The stereoscopic display apparatus of claim 1, wherein the display panel comprises a liquid crystal display panel.

* * * * *